United States Patent
Hostalek et al.

(10) Patent No.: US 6,740,302 B2
(45) Date of Patent: May 25, 2004

(54) METHOD FOR PRODUCING HIGH-PURITY SULPHURIC ACID

(75) Inventors: Martin Hostalek, Darmstadt (DE); Werner Büttner, Darmstadt-Arheilgen (DE); Rolf Hafner, Egelbach (DE); Chih-Peng Lu, Taipei (TW); Ching-Jung Kan, Nan-Tou (TW); Ekkehart Seitz, Seeheim-Jungenheim (DE); Ernst Friedel, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/168,869

(22) PCT Filed: Dec. 7, 2000

(86) PCT No.: PCT/EP00/12327

§ 371 (c)(1), (2), (4) Date: Jun. 26, 2002

(87) PCT Pub. No.: WO01/47804

PCT Pub. Date: Jul. 5, 2001

(65) Prior Publication Data

US 2002/0192144 A1 Dec. 19, 2002

(30) Foreign Application Priority Data

Dec. 28, 1999 (DE) .......................... 199 63 509

(51) Int. Cl.[7] .................. C01B 17/69; C01B 17/74; C01B 17/82; C01B 17/90
(52) U.S. Cl. .................. 423/523; 423/522; 423/531; 423/532
(58) Field of Search ................ 423/522, 523, 423/531, 532

(56) References Cited

U.S. PATENT DOCUMENTS

| | | | | |
|---|---|---|---|---|
| 2,562,240 A | * | 7/1951 | Merriam et al. | 423/523 |
| 3,760,061 A | | 9/1973 | Hammond | 423/242 |
| 3,948,624 A | * | 4/1976 | Fornoff et al. | 55/73 |
| 5,711,928 A | | 1/1998 | Morisaki | 423/522 |
| 6,627,172 B1 | * | 9/2003 | Wagner et al. | 423/522 |

FOREIGN PATENT DOCUMENTS

| | | | | |
|---|---|---|---|---|
| DE | 36 32 623 A1 | * | 3/1988 | 423/522 |
| EP | 0150282 A1 | | 8/1985 | |
| EP | 460745 A1 | * | 12/1991 | |
| SU | 182699 | * | 6/1966 | 423/522 |
| SU | 186402 | * | 10/1966 | 423/522 |

OTHER PUBLICATIONS

George Segeler *Fuel Flue Gases* pub. by the American Gas Association, U.S.A., pp. 113–114.*
Gaspierk, I. et al., Databse Chemabs 'Onllne! Chemical Abstracts Service, "Manufacture of sulfuric acid useful in microelectronics," Database Accession No. 111:80844 CA XP002163475 Abstract for CS 259 353B (Oct. 14, 1988).

* cited by examiner

*Primary Examiner*—Wayne A. Langel
(74) *Attorney, Agent, or Firm*—Miller, White, Zelano, Branigan, P.C.

(57) ABSTRACT

The invention relates to a novel method for producing high-purity sulfuric acid for use in the semiconductor industry. The method comprises the addition of a hydrogen peroxide solution to an engineered oelum in order to reduce the $SO_2$ concentration, evaporation of the $SO_3$ and separation of acid traces. The high-purity $SO_3$ is then enriched with inert gas and the $SO_3$ is absorbed into sulfuric acid.

21 Claims, 3 Drawing Sheets

METHOD FOR PRODUCING HIGH-PURITY SULPHURIC ACID

The present invention relates to a novel process for producing high purity sulfuric acid for use in the semiconductor industry.

Pure sulfuric acid can be produced on an industrial scale by passing $SO_3$ into dilute sulfuric acid, by combining $SO_3$ and pure water or by distillation of sulfuric acid at atmospheric or reduced pressure.

The quality of the sulfuric acid produced is affected not only by the design of the plants and the quality of the raw materials used, but also by the type and quality of the materials of construction used in the plant. These have an appreciable bearing on the level of undesirable metal ions, but also on the level of particles.

It is known to produce relatively high purity concentrated sulfuric acid by having $SO_3$ evaporated or expelled from oleum in a distillation flask and then introduced into dilute pure sulfuric acid. In particular embodiments, the evaporation is occasionally carried out in a falling film evaporator. Generally, the equipment used for producing pure sulfuric acid is made of glass or of enamel-lined steel. Depending on the quality used, these materials may leach ionogenic and/or particulate impurities.

Existing processes have the disadvantage that, in the event of nonuniform evaporation, the gas stream may entrain drops of liquid in the form of a fine mist and any impurities present therein into the end product. This happens in particular on conducting the evaporation in falling film evaporators customarily used on an industrial scale, but also on using distillation flasks.

Another disadvantage is the $SO_2$ still present in the sulfuric acid after purification.

It is an object of the present invention to provide an improved, economical way of producing on an industrial scale for use in the semiconductor industry a high purity sulfuric acid that is ideally free of metal ions and $SO_2$, but ideally also free of particles in particular.

This object is achieved by a continuously operable process for producing high purity sulfuric acid for the semiconductor industry, which is characterized in that a) hydrogen peroxide solution having a concentration of 1–70% is added to 24–70% technical grade oleum in a sufficient amount to lower the $SO_2$ concentration to below 10 ppm,
b) the $SO_3$ in the oleum is evaporated at 90–130° C. in a falling film evaporator,
c) sulfuric acid and nitrosylsulfuric acid traces are removed from the $SO_3$ gas stream escaping from the evaporator by means of a demister, for example in the form of a candle filter,
d) the high purity $SO_3$ is enriched with inert gas, and
e) the $SO_3$ is absorbed in sulfuric acid of a concentration of 90–99% with cooling.

High purity deionized water is added to adjust the concentration of the high purity sulfuric acid to a desired concentration, the concentration adjustment being closed loop controlled by conductivity measurement.

In a particular embodiment of the process according to the invention, a portion of the high purity sulfuric acid stream obtained is recycled back into the absorption space.

The high purity sulfuric acid obtained by the process according to the invention is collected in PTFE-lined storage vessels.

Particulate impurities formed or entrained are removed from the sulfuric acid using a one- to three-stage filtration.

The process according to the invention is preferably carried out using PFA or PTFE filters having a pore size of 0.1 $\mu$m to 1 $\mu$m.

The $SO_3$ is advantageously absorbed cocurrently in a PTFE-lined reactor containing packing elements of PFA. The heat of reaction formed is removed in a downstream tube bundle reactor made of PFA or fluorinated polyolefins under an inert gas cushion.

The high purity $SO_3$ is enriched with ultrapure nitrogen or highly purified air as inert gas to an inert gas concentration between 1 to 50%.

A demister made of high purity PFA or fluorinated polyolefins is used.

Vent gases are treated with pure sulfuric acid in a scrubber.

It has been experimentally determined that high purity sulfuric acid meeting the abovementioned criteria is produced economically on an industrial scale on subjecting the concentrated technical grade starting quality to a stagewise treatment and purification, although the overall process is per se operable continuously.

The tests which have been carried out have shown that, in an upstream step, the $SO_2$ content of concentrated sulfuric acid of technical grade quality (oleum having a concentration between 24–70%) can be lowered to concentrations of less than 1 ppm by the addition of small amounts of hydrogen peroxide. The $SO_2$ concentration in oleum is determined according to customary methods of titration representing the best in analytical technology. Such a method is described, for example, in JIS K8951$^{-1995}$.

It is advantageous for this purpose to use hydrogen peroxide solutions having a concentration between 1 to 70%. It is generally sufficient to add hydrogen peroxide solution in an amount of 0.001 to 0.1%, based on the amount of concentrated sulfuric acid or oleum to be treated, to oxidize the $SO_2$ present therein.

The method of adding the hydrogen peroxide solution to the technical grade oleum is not critical per se. Addition may be via a dip tube installed at the bottom of the oleum buffer tank FIG. 1 (3), which is disposed downstream of the oleum tower FIG. 1 (2). Mixing takes place automatically as a consequence of the convection due to the heat released in the tank. It is also possible to add the hydrogen peroxide solution elsewhere in the tank. However, the latter option would necessitate additional internals and possibly a form of mechanical mixing, for example stirring.

Figure 1:
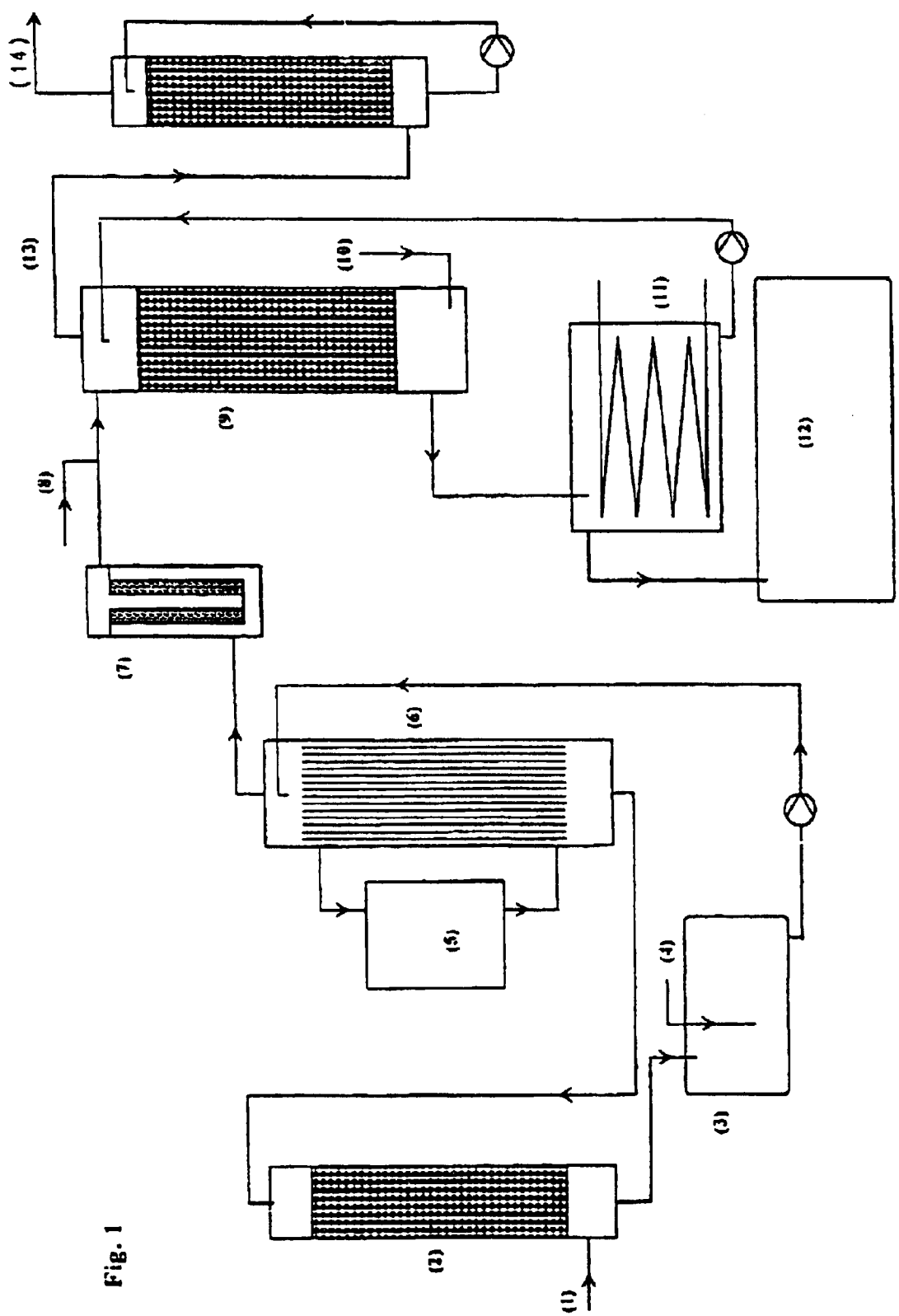
FIG. 1 is a schematic flow diagram of a plant according to the invention.

Pure $SO_3$ free of sulfuric acid is then obtained on evaporating $SO_3$ from the $SO_2$-free oleum under mild conditions in a falling film evaporator FIG. 1 (6) equipped with a precisely controllable heating system FIG. 1 (5).

A falling film evaporator suitable for this purpose has the following properties:

homogeneous liquid distribution,
low gas velocity,
pressure control by siphons, which contributes to plant accident avoidance,
a low overpressure,
low temperatures of oleum and heating gas,
uniform heating of the product to be treated.

The use of such a falling film evaporator guarantees an extremely low level of release of droplets of liquid (mist), which might entrain impurities, from the oleum.

The oleum having the lowered $SO_3$ content is recycled and restored with $SO_3$ to its original concentration in a so-called oleum tower FIG. 1 (2).

The $SO_3$ obtained by treatment in the falling film evaporator is subsequently passed through a suitable demister FIG. 1 (7) to remove any sulfuric acid and nitrosylsulfuric acid traces and any solid particles still present. The filter additionally collects condensable or absorbable impurities, for example iron from the gas phase. The filter used for this purpose is preferably a so-called candle filter. Particularly useful candle filters for this purpose are made of high purity PFA or fluorinated polyolefin containing no cationic impurities.

This filter treatment further reduces the fraction of any liquid fractions (droplets) still present in the gas stream. Also removed are impurities that condense at low temperature or that, as in the case of nitrosylsulfuric acid for example, become absorbable owing to the wetting of the filter cloth with sulfuric acid.

It has been found that a particularly low $SO_2$ end product is obtainable on enriching the high purity $SO_3$ stream with an inert gas, such as nitrogen or air. It has been found in particular that the presence of these gases causes $SO_2$ still present in the $SO_3$ gas stream to be absorbed in concentrated sulfuric acid to a far lesser extent.

Therefore, the high purity $SO_3$ emerging from the demister is enriched with 1 to 50% of inert gas, for example ultrapure nitrogen or highly purified air, FIG. 1 (8), in order that small traces of $SO_2$ still present in the $SO_3$ may be removed down to levels below the present limit of detection in the end product.

It is essential that high purity inert gas be used for this enrichment. Suitable inert gases are ultrapure nitrogen or air purified according to specific processes in which ambient air is compressed, cooled, prefiltered, dehumidified and end-filtered. The latter is done using suitable filters to remove particles having specific diameters $\leq 0.01$ $\mu$m.

To prevent renewed contamination of the high purity $SO_3$ gas, the lines used to conduct the $SO_3$ are pipelines having an inner lining of high purity PTFE or fluorinated polyolefins.

In the subsequent production step, the gas stream is passed into an absorption tower FIG. 1 (9), ie. into a reactor lined with PFA or with fluorinated polyolefin and packed with specific packing elements composed of PTFE or fluorinated polyolefin. In this reactor, the gas is passed cocurrently with a concentrated sulfuric acid to absorb the $SO_3$ in the dilute sulfuric acid. The high purity and cocurrently routed sulfuric acid used for this purpose has a concentration between 90 and 99%.

The sulfuric acid formed in the absorption tower FIG. 1 (9) or in the absorption column is diluted with high purity water FIG. 1 (10) to the original concentration, cooled FIG. 1 (11) and passed back at the top of the absorption tower. Ultrapure water is introduced at the base of the absorption column ahead of the subsequent heat exchanger FIG. 1 (11) to remove the heat evolved in the course of the addition of water.

The heat of reaction formed during the absorption is removed in a subsequent heat exchanger FIG. 1 (11) having an inner lining of PFA or fluorinated polyolefin. A particularly suitable heat exchanger for this purpose is a tube bundle tank cooler. This cooler tank is preferably operated under an inert gas cushion.

The desired concentration is set by adding high purity, deionized water. The addition of water is closed loop controlled by conductivity measurement in the end product. This last step can be carried out batchwise in the collected product, in a particular embodiment. Preferably the conductivity is measured continuously and their concentration is adjusted continuously.

To conduct the purification continuously, a portion of the high purity sulfuric acid stream obtained is continually recycled back into the top of the absorption tower. The other portion of the stream is passed at FIG. 1 (12) into PTFE storage tanks or into storage tanks lined with fluorinated polyolefin. After quality control, the sulfuric acid is filtered to remove any particulate impurities and filled into suitable storage or transit containers.

The filling can be effected via a clean coupling box into ISO containers made of PTFE or lined with fluorinated polyolefin.

The inert gas FIG. 1 (13) remaining behind after the absorption process has been carried out and containing small amounts of $SO_2$ is washed in a scrubber FIG. 1 (13) with pure sulfuric acid having a concentration of 90–99%. The product thus obtained is used for less critical applications outside the semiconductor industry.

When analysis of the high purity sulfuric acid produced shows it to contain an unacceptable particle count, the filling stage can be preceded by a filtration. A particularly suitable filtration system is a three-stage filtration. In it, the purified sulfuric acid is freed in stages from particles having an average cross section >1 $\mu$m, >0.5 $\mu$m and >0.1 $\mu$m by filtration. Filters composed of PFA or fluorinated polyolefin can be used for this purpose.

Such a stage filtration is known per se to one skilled in the art and is used to remove particles which may have passed into the product by attrition in the absorption tower and subsequent plant sections. Usually filters having different pore sizes are connected in series for this purpose. However, it is also possible to use successive filters having the same pore size. This can be sensible, since, as will be known by one skilled in the art, the retention rate for filters of a defined pore size is not 100% even for particles larger than the indicated pore size.

The tests which have been carried out have shown that the process provided by the invention provides a consistent quality of high purity sulfuric acid on a continuous basis. Another advantage is the possibility, if necessary, of adding the described three-stage filtration with decreasing pore size to reduce the particle count as desired.

The subsequent analysis by way of final control ensures a purity in the ppt range for the end user.

This is of particular importance, since the chemicals used for the manufacture of microchips have to meet particularly high purity requirements. This relates in particular to the concentration of cationic, anionic and particulate impurities. According to the present requirements for the application mentioned, the users stipulate maximum limits in the range 1–100 ppt for cationic impurities, in the range of 10 ppt to 50 ppb for anionic impurities and particle contents of <10-<1000 particles. Different values apply for each chemical.

This is achieved in particular when the plant is laid out in such a way that all parts of the plant which come into contact with the sulfuric acid to be purified and the purified sulfuric acid are made of or lined with materials of construction that are inert with regard to concentrated sulfuric acid.

The process of the invention is particularly useful in combination with a plant for synthesizing $SO_3$.

Figure 2:
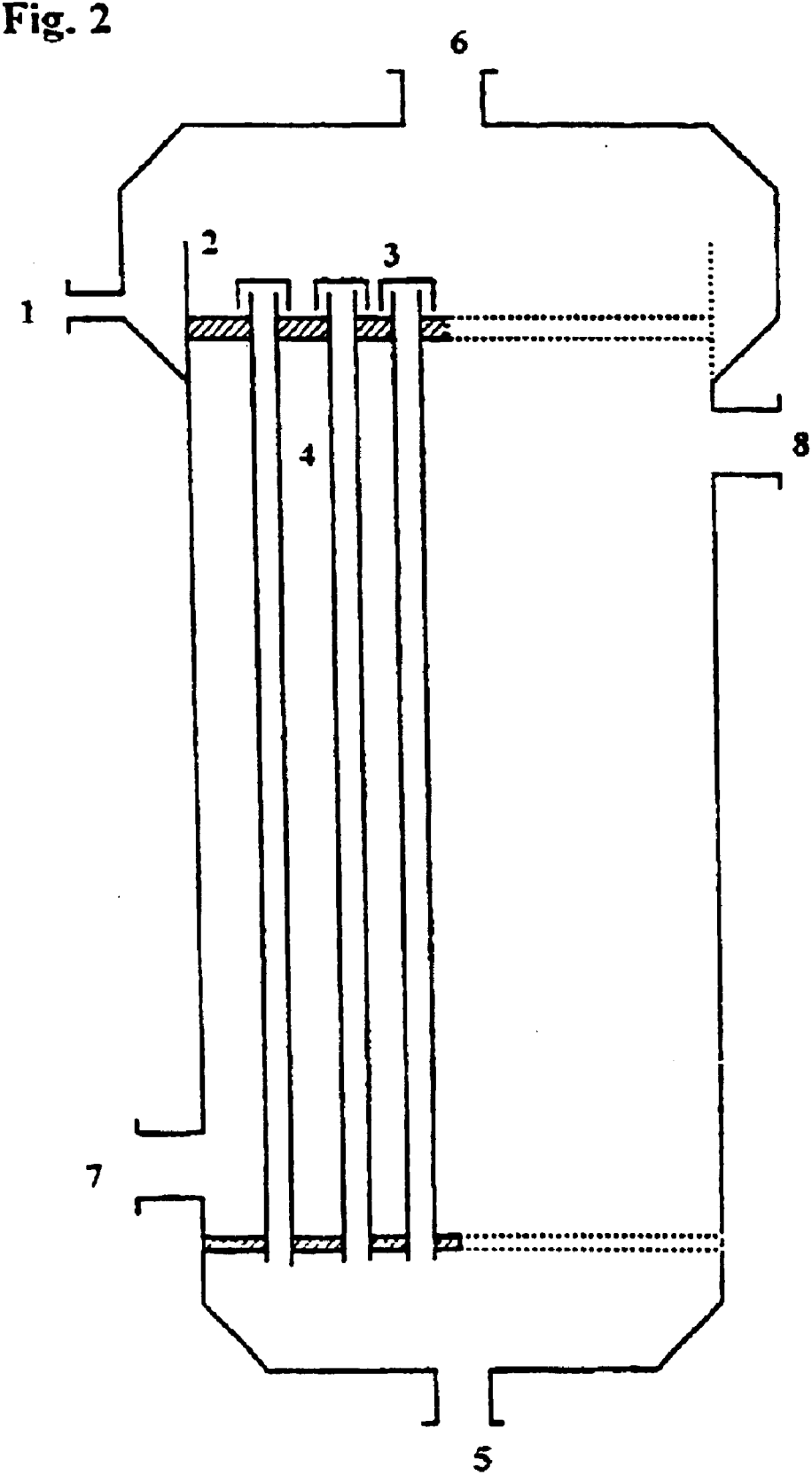
FIG. 2 shows the schematic construction of an oleum evaporator useful in the process of the invention.
Figure 3:
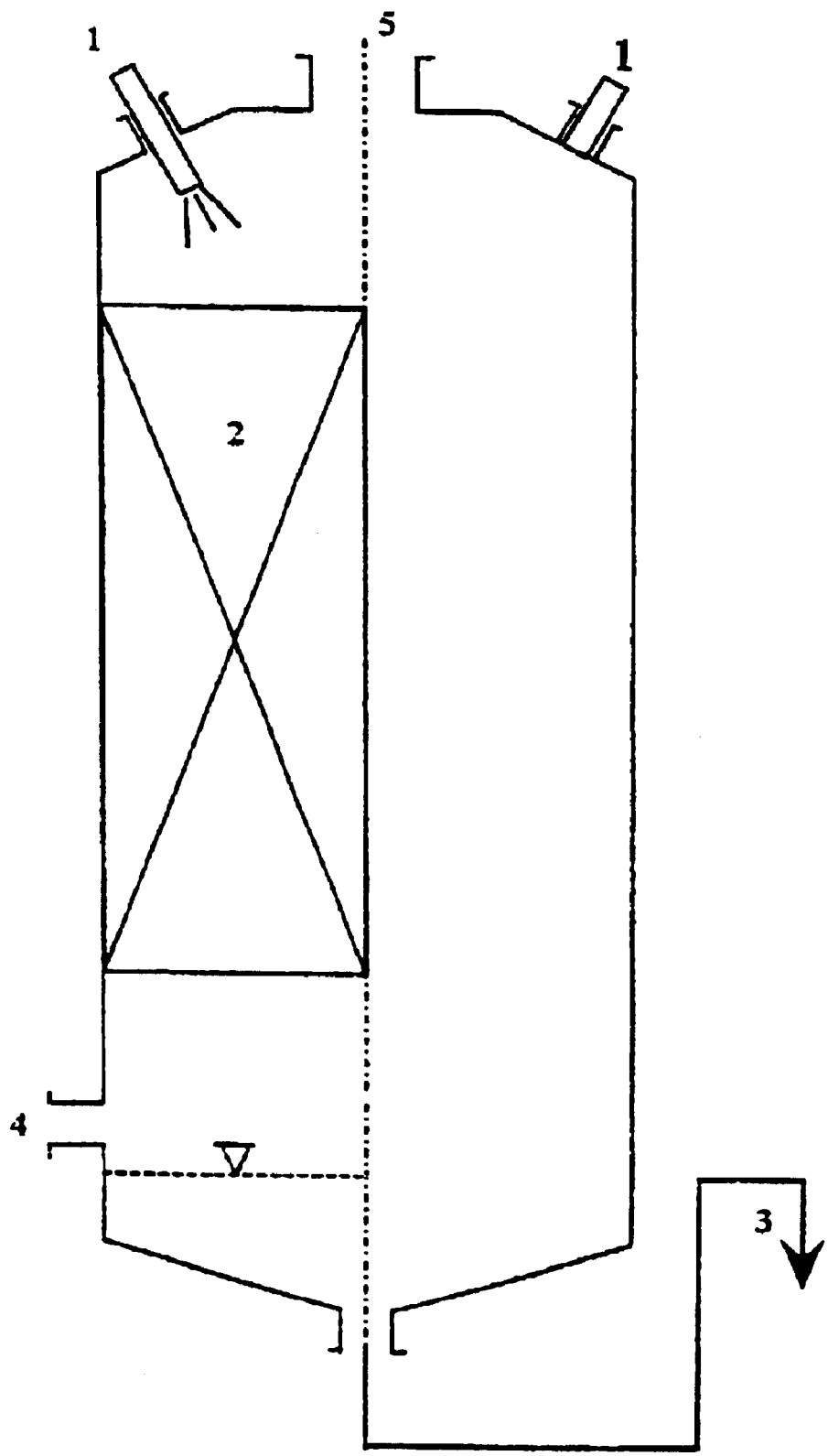
FIG. 3 shows in turn the schematic construction of an absorber or absorption tower useful in the process of the invention.

FIG. 1 is a schematic flow diagram of a plant according to the invention; the components shown therein have the following meanings:

(1) $SO_3$ feed
(2) Oleum tower
(3) Oleum buffer tank
(4) Hydrogen peroxide feed
(5) Heating system
(6) Evaporator
(7) Demister
(8) Inert gas feed
(9) Absorption tower
(10) Ultrapure water feed
(11) Cooling
(12) End product
(13) Offgas
(14) Purified offgas FIG. 2 shows the schematic construction of an oleum evaporator useful in the process. The individual components have the following meanings:

(1) Oleum entry
(2) First overflow weir
(3) Pipe distributor caps
(4) Evaporator tube
(5) Oleum outlet
(6) $SO_3$ takeoff
(7) Hot air entry
(8) Hot air exit FIG. 3 shows in turn the schematic construction of an absorber or absorption tower useful in the process. The components shown therein have the hereinbelow indicated meanings:

(1) Acid distributor nozzles
(2) Packing layer
(3) Acid outlet to cooler
(4) Inert outlet
(5) $SO_3$ outlet The scope of the present invention covers not just the plants described and schematically depicted. The scope is to be understood as also including generalizations or modifications that occur to a person skilled in the art or equivalent components performing the same purpose.

What is claimed is:

1. A process for producing high purity sulfuric acid comprising:
    a) adding hydrogen peroxide solution having a concentration of 1–70% to 24–70% technical grade oleum in a sufficient amount to lower the $SO_2$ concentration to below 10 ppm,
    b) evaporating $SO_3$ in the oleum at 90–130° C. in a falling film evaporator,
    c) removing traces of sulfuric acid and nitrosyl sulfuric acid from the resultant $SO_3$ gas stream escaping from the evaporator by means of a demister,
    d) enriching the high purity $SO_3$ with inert gas, and
    e) absorbing the $SO_3$ in sulfuric acid at a concentration of 90–99% to form said high purity sulphuric acid.

2. A process according to claim 1, wherein a portion of the high purity sulfuric acid stream obtained is recycled back to the absorption step.

3. A process according to claim 1, wherein high purity deionized water is added to said high purity sulfuric acid to adjust the concentration thereof, of the high purity sulfuric acid to a desired concentration, the and wherein the concentration adjustment is closed loop controlled by conductivity measurement.

4. A process according to claim 1, wherein the high purity sulfuric acid obtained is filled into PTFE-lined storage vessels or containers.

5. A process according to claim 1, further comprising removing particles from the resultant high purity sulfuric acid using a three-stage filtration.

6. A process according to claim 5, wherein in the removal of particles by filtration PFA or PTFE filters having a pore size of 0.1 $\mu$m to 1 $\mu$m are used.

7. A process according to claim 1, wherein absorption of $SO_3$ is performed cocurrently in a PTFE-lined reactor containing packing elements of PFA.

8. A process according to claim 1, wherein the heat of reaction formed is removed in a tube bundle reactor made of PFA or fluorinated polyolefins under an inert gas cushion downstream of adsorption of $SO_3$.

9. A process according to claim 1, wherein said high purity $SO_3$ is enriched with ultrapure nitrogen or highly purified air as said inert gas to an inert gas concentration between 1 to 50%.

10. A process according to claim 1, wherein said demister is made of high purity PFA or fluorinated polyolefins.

11. A process according to claim 1, wherein vent gases from the absorption step are treated with pure sulfuric acid in a scrubber.

12. A process according to claim 1, wherein said demister is a candle filter.

13. A process according to claim 12, wherein said candle filter is made of high purity PFA or fluorinated polyolefin containing no cationic impurities.

14. A process according to claim 1, wherein said vent gases from the absorption step are treated with sulfuric acid at a concentration of 90–99%.

15. A process according to claim 1, further comprising removing particles from the resultant high purity sulfuric acid using a one- to three-stage filtration.

16. A process according to claim 1, wherein hydrogen peroxide solution is added in an amount of 0.001 to 0.1%, based on the amount of oleum to be treated.

17. A process according to claim 1, wherein said inert gas is ultrapure nitrogen or purified air.

18. A process according to claim 1, wherein the sulfuric acid formed by absorption is diluted with high purity water and cooled, and a portion of the resultant diluted, cooled sulphuric acid is passed back to the absorption step.

19. A process according to claim 18, wherein absorption is performed in an absorption column and cooling is performed in a subsequent heat exchanger, and said high purity water is introduced at the base of said absorption column ahead of the subsequent heat exchanger.

20. A process for producing product sulfuric acid comprising:
    a) adding hydrogen peroxide solution having a concentration of 1–70% to 24–70% technical grade oleum in a sufficient amount to lower the $SO_2$ concentration to below 10 ppm, b) evaporating $SO_3$ in the oleum at 90–130° C. in a falling film evaporator, c) removing traces of sulfuric acid and nitrosyl sulfuric acid from the resultant $SO_3$ gas stream escaping from the evaporator by means of a demister, d) enriching the high purity $SO_3$ with inert gas, e) absorbing the $SO_3$ in sulfuric acid at a concentration of 90–99% to form said product sulphuric acid, and f) cooling said product sulphuric acid.

21. A process comprising:

a) adding hydrogen peroxide solution having a concentration of 1–70% to 24–70% technical grade oleum in a sufficient amount to lower the $SO_2$ concentration to below 10 ppm, b) evaporating $SO_3$ in the oleum at 90–130° C. in a falling film evaporator, and c) removing traces of sulfuric acid and nitrosyl sulfuric acid from the resultant $SO_3$ gas stream escaping from the evaporator by means of a demister.

* * * * *